Nov. 19, 1940. F. W. SLACK 2,222,377
SUSPENSION MECHANISM
Filed Feb. 10, 1939 2 Sheets-Sheet 2
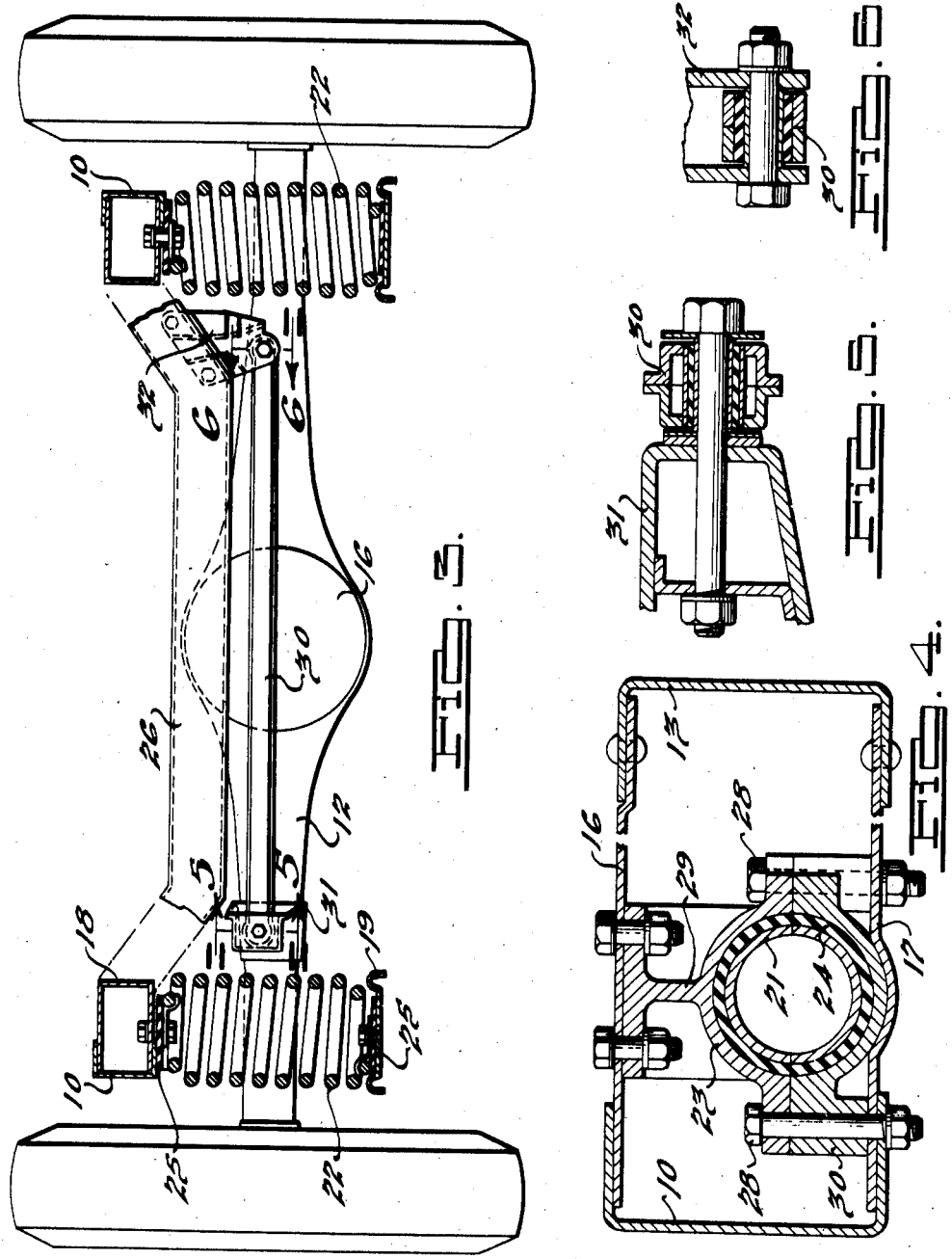
INVENTOR
Frederic W. Slack.
BY Harness, Lind, Patee & Harris
ATTORNEYS.

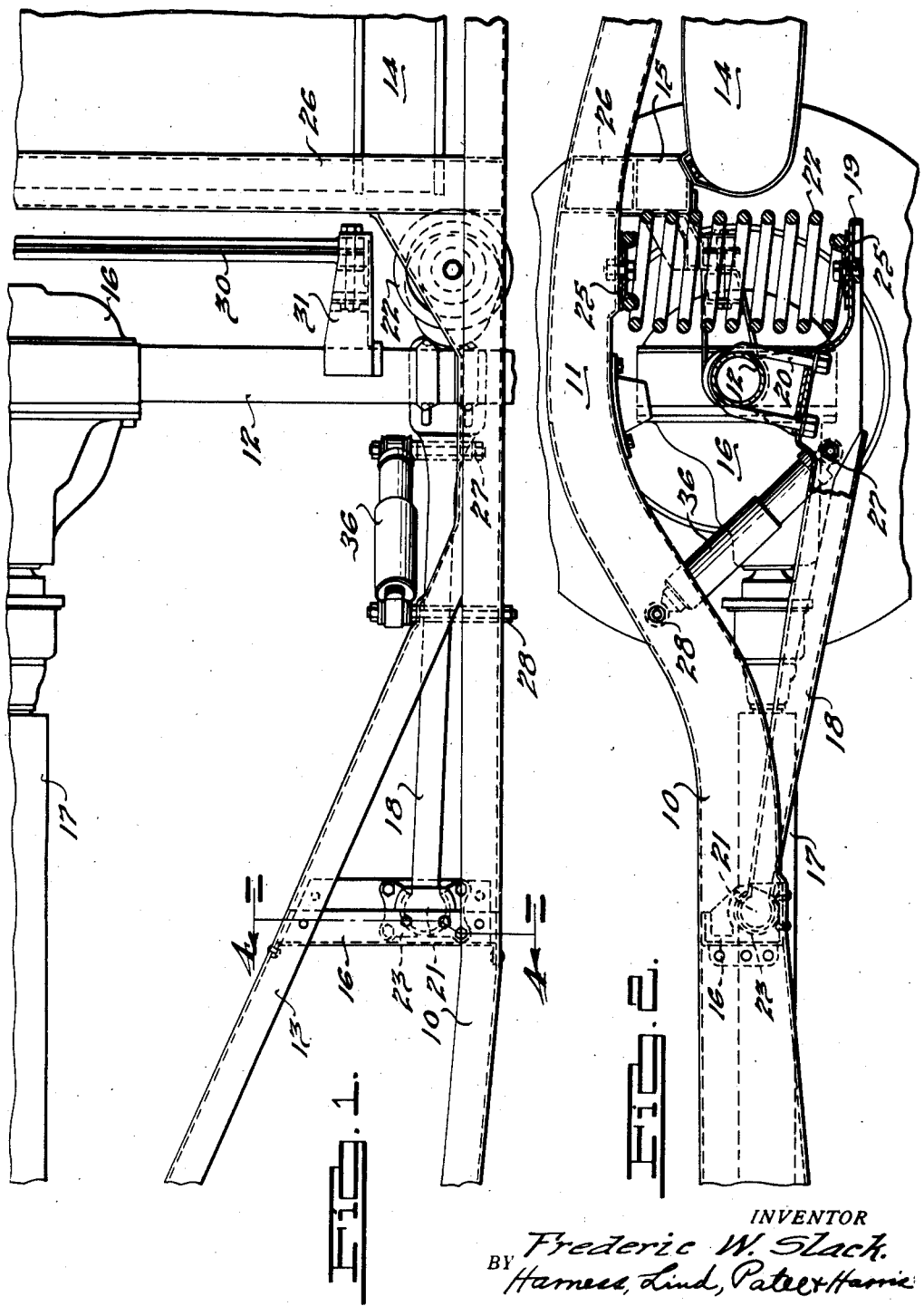

Patented Nov. 19, 1940

2,222,377

UNITED STATES PATENT OFFICE 2,222,377

SUSPENSION MECHANISM

Frederic W. Slack, Detroit, Mich., assignor to Chrysler Corporation, Highland Park, Mich., a corporation of Delaware Application February 10, 1939, Serial No. 255,587

1 Claim. (Cl. 267—20)

This invention relates to spring suspensions for vehicles and particularly to a suspension for the driven axle thereof.

It is the principal object of the invention to provide a coil spring suspension for a driven axle in which the thrust and reaction torque incident to the driving of the vehicle are transmitted to the frame through relatively light weight radius rods rather than through a torque tube construction which is of necessity a heavy and expensive structure.

A further object is to provide a suspension of this nature which is compact and economical to manufacture.

A preferred embodiment of the invention is illustrated in the accompanying drawings, in which:

Fig. 1 is a fragmentary plan view of a vehicle chassis embodying the improved suspension.

Fig. 2 is a side elevation thereof, partly in section.

Fig. 3 is a rear elevation, some of the parts being shown in section.

Fig. 4 is a section along the line 4—4 of Fig. 1.

Fig. 5 is a section along the line 5—5 of Fig. 3.

Fig. 6 is a section along the line 6—6 of Fig. 3.

Referring to the drawings, 10 designates a chassis side sill, which is of the usual inwardly presenting channel construction, and is provided with the usual kick-up portion 11 which extends over the axle 12. One arm of an X-brace member 13 extends outwardly from the central portion of the vehicle to join the side sill 10 in the region of the axle. The X-brace member is of outwardly presenting channel section and cooperates with the side sill to form a rigid box section throughout the region adjacent the axle, as indicated in Figs. 1 and 3. A fuel tank 14 is supported from the chassis at the rear thereof by means of a bracket 15 extending downwardly from the rear transverse cross member 26.

The axle 12 is provided with the usual differential casing 16 containing the differential gears which are adapted to be driven by the propeller shaft 17, and is supported on the frame through a combined torque and radius arm 18 and a coil spring 22. The radius arm 18 is of hollow welded construction and has a ball 21 formed integrally on its forward end which is adapted to be received in a complementary socket formed in the hanger member 23 which is in turn fastened to the chassis in a manner which will be presently described.

Radius arm 18 is formed of relatively light gauge sheet metal by a stamping operation in order to save weight and is fastened to the axle 12 by means of a pair of U-bolts 20 as shown in Fig. 2. The rearwardly extending portion 19 of arm 18 forms a spring seat on which is suitably fastened the coil spring 22. The upper end of the spring bears against the box portion of the chassis sill to which it is suitably fastened just forwardly of the rear transverse brace member 26 (see Figs. 2 and 3). Rubber pads 25 are provided at each end of the spring to insure quietness. A shock absorber 26 of the direct acting type is fastened to the radius arm at 27 and to the side sill at 28 and assists in controlling the rising and falling movement of the axle 12 with respect to the frame. The connections 27 and 28 are preferably of the rubber bushing type which requires no lubrication.

Referring to Fig. 4, it will be seen that a rigid box section anchorage for the forward end of the radius arm has been provided by the simple expedient of bridging the side sill and X-brace arm at this point with gusset plates 16 and 17 respectively, which are riveted to the upper and lower flanges of the chassis members. The upper portion 29 of the hanger 23 is bolted to plate 16 while the lower portion 30 is fastened to plate 17 by bolts 28 which also serve to hold the parts 29 and 30 in clamping engagement with the ball portion 21 of the radius arm. A resilient pad 24 of rubber or similar material prevents metal-to-metal contact between the ball and hanger and permits universal movement therebetween.

It is of course understood that the parts forming the suspension mechanism just described are duplicated at the other side of the vehicle and it will thus be seen that an extremely simple and compact suspension unit has been provided. By the use of stamped parts the weight has been kept at a minimum without sacrifice of strength and the use of rubber bushings and pads between all moving parts has eliminated the need for lubrication entirely. The driving thrust and reaction torque are transmitted to the frame through the radius arms 18 rather than through a heavy torque tube construction, thereby keeping the weight of the unsprung parts at a minimum and preventing to some extent the advantage of the well-known Hotchkiss drive, for which my suspension has been adapted.

It will be apparent from the description that the radius arms 18 will confine the axle 12 to a definite arc of movement in the vertical plane. Due to the inherent instability of the coil springs, it is necessary to provide some means for similarly restricting relative movement between the frame and axle in a plane transverse to the vehicle. This has been accomplished by providing a lateral stabilizing bar 30 formed of a pair of similar channel-shaped stampings welded together along their mating edges as shown in Figs. 5 and 6. The bar 30 is pivoted at one end to the axle mounted bracket 31 and at its other end to the frame mounted bracket 32. Yieldable sleeves of rubber or similar material are provided, as shown in Figs. 5 and 6, to insure quietness, eliminate the need for lubrication and allow the slight degree of universal movement necessary to accommodate the arcuate movement of the axle.

It is desired to point out that while a preferred embodiment of the invention has been described, various changes in some or all of the parts may be made without departing from the spirit or scope of the invention which is limited only as defined in the following claim.

I claim:

In a motor vehicle, in combination, a chassis frame including side sills of inwardly presenting channel section, a drive axle, a radius arm connecting said axle and frame at each side of the vehicle, said arms each having universal connection with the frame forwardly of the axle and extending rearwardly of the axle to form a spring seat, direct acting shock absorbers connecting said frame and radius arms forwardly of the axle, a brace member of outwardly presenting channel section united to said side sills in the regions adjacent said axle and extending forwardly in spaced relation to said sills, upper and lower plate members united to the upper and lower flanges of said respective sill and brace members and forming a box section therewith, means mounted within said respective box sections for clampingly receiving the forward ends of said radius arms, and a third radius arm disposed transversely of the vehicle and pivotally connected to said axle and frame respectively.

FREDERIC W. SLACK.

CERTIFICATE OF CORRECTION.

Patent No. 2,222,377.  November 19, 1940.

FREDERIC W. SLACK

It is hereby certified that error appears in the printed specification of the above numbered patent requiring correction as follows: Page 1, second column, line 47, for the word "preventing" read --preserving--; and that the said Letters Patent should be read with this correction therein that the same may conform to the record of the case in the Patent Office.

Signed and sealed this 8th day of April, A. D. 1941.

(Seal)

Henry Van Arsdale,
Acting Commissioner of Patents.